Patented June 12, 1945

2,378,244

UNITED STATES PATENT OFFICE 2,378,244

METHOD OF EDGE GLUING WOOD VENEERS

Henry D. Pfenning, Beaverton, Oreg., assignor of one-half to B. P. John Furniture Corporation, Portland, Oreg., a corporation of Oregon No Drawing. Application March 30, 1942, Serial No. 436,913

11 Claims. (Cl. 144—309)

This invention relates to an improved method of joining wood veneers, and has particular reference to a novel arrangement of the steps comprising the method whereby there is a continuity of uniform and conjoint operation for producing a desired result.

Heretofore the edge gluing of veneers has entailed the prior preparation of the veneers to be joined by squaring the edges of the veneers in a jointing machine and thereupon applying glue to the said edges. Preferably, the glue is applied while the veneers are still in the jointer and while the edges of the veneers are held tightly together and are perfectly even. The veneers are then spread apart and the glue allowed to dry. Thereafter a moistening and setting agent is applied to the previously glued edges, the edges are brought together and held tightly in edge to edge relation, and heat is applied to the joint to soften and then set the glue.

In the procedure embodying the present invention, in contradistinction to the slow, time-consuming and expensive separated steps of first gluing, drying and then moistening the veneers before completing the joint, the veneers are fed directly to a conveying means comprising a pressing and heating mechanism, a resinous adhesive being applied to the edges of the veneers as they are fed to the conveyer and the treated edges being thereupon brought tightly together to effect a glued joint, heat being applied to set the glue.

The objects of the invention include, among others, the provision of an improved method of edge-gluing veneers which is productive of a greatly shortened assembly time; the provision of a method of joining veneers which eliminates the handling and drying of the veneers after glue is initially applied thereto and before completion of the joint; the provision of a method of joining veneers which greatly accelerates the delivery of the finished product; and the provision of a method of joining veneers which is productive of a material saving in labor and equipment.

It is a further object of the invention to provide a preparation of resinous adhesive possessing the properties of being applicable to the edges of wood veneers immediately preceding the application of heat and pressure thereto, and which will react, when subjected to heat and pressure, to form a bond of great strength; the provision of a resinous composition having glue characteristics which may be applied to veneers in a veneer splicing machine immediately prior to the application of heat and pressure thereto and which is easily and readily removed from the surfaces of the conveying and heating elements; the provision of a resinous adhesive preparation which is available for use with much less preparatory effort and time than prior adhesives of said type; and the preparation of a resinous adhesive which may be kept for relatively long periods of time without deterioration.

It is a further object of the invention to provide a sheet of veneer comprising several pieces of veneers bonded in edge to edge relation and having greatly improved characteristics, as will appear more fully hereinafter.

The invention comprises the steps of conveying strips of wood veneer in a horizontal plane in side by side positions, applying a resinous adhesive to the juxtaposed edges of said veneers while being so conveyed, pressing said edges together during the travel of said veneer strips along said conveyer, and applying heat to the joint between veneer strips simultaneously with the application of pressure thereto.

It is preferred, of course, that the edges of the several veneer strips be squared and longitudinally straight. This may be done in a jointing machine, or by the use of a clipper knife arranged for operation in a plane at a right angle to the surface of the veneer. Thereupon, the veneer strips are delivered to the infeed end of a conveyer mechanism so constructed and arranged as to convey the strips in side by side relation to a point of delivery, and which, at the same time, functions to press the abutting edges of the veneers tightly together to effect a glued joint. At a point adjacent the infeed end of the conveying mechanism, a resinous adhesive is applied to the facing edges of the veneer strips, this being accomplished as the veneers pass an adhesive applying station. Simultaneously with the application of pressure to the joint, heat is applied to set the adhesive, the product of the method being a sheet of veneer comprising the several veneer strips bonded in edge to edge relation.

The invention includes the preparation of a resinous adhesive composition which may be applied to the veneers immediately prior to the application of heat and pressure thereto and which, although quantities thereof may inadvertently be spread upon the heating elements, is easily removable from the surfaces of the heating elements as by the action of the veneers passing thereover. This is of primary importance, and the discovery of a resinous adhesive which will produce a bond of great strength for joining veneer strips in edge to edge relation, and yet which is easily removed from the surfaces of the heating elements in a veneer splicing machine, has contributed very materially to the commercial feasibility of the method herein described.

Veneer splicing machines for joining wood veneers in edge to edge relation are well known in the art. Heretofore the use of these machines has been limited to the joining of veneers to which glue has previously been applied, the glue having been permitted to dry before the veneers are fed to the splicer. The reason for this procedure has been that if wet glue of the type usually employed for joining veneers in these machines were applied to the veneers immediately prior to the application of heat and pressure in a splicing machine, the glue deposits formed on the surfaces of the heating elements would damage the veneers, requiring reclipping of the veneers, and resulting in the waste of a considerable quantity of valuable wood. Moreover, the fouling of the heating elements by deposits of glue thereupon would require the frequent shutting down of the machine and the partial disassembly thereof for the purpose of chipping these deposits from the heating elements. This operation would, of necessity, be repeated several times each day in order to keep the machine in working order. An advantage of the instant invention resides in the fact that deposits of the resinous composition are easily removed from the surfaces of the heating elements in the machine. Whenever deposits of applicant's adhesive tend to build up on the heating elements, these may be removed simply by inserting a strip of soft metal in the machine in the line of veneers passing therethrough, this being sufficient to scrape deposits from the heating elements. Although the deposits of the adhesive are easily removed from the heating elements, the bond formed thereby between adjacent veneer strips is of exceptional strength.

The present invention has been developed around the use of a readily soluble, powdered resin and an extender in a wet mixture, with a catalyst which reacts to retard setting of the adhesive at relatively low temperatures and which hastens the setting of the adhesive at elevated temperatures. Adhesives prepared according to the instant disclosure may be kept for relatively long periods of time if stored in a cool place. For example, the composition may be kept for twenty-four hours at a temperature not above 60° F., whereas, at temperatures of from 300° F. to 500° F., from fifteen to twenty seconds is sufficient to effect the formation of a strong and permanent bond. It should be noted that in the practice of the invention the bond between adjacent veneers is effected as a result of chemical reaction, and that heat is employed solely for the purpose of accelerating this reaction.

The following is an example of a resinous adhesive in accordance with the disclosure above set forth:

| | Parts |
|---|---|
| Resin (powdered) | 11.0 |
| Wood flour | .5 |
| Water | 9.0 |
| Formaldehyde | .4 |

All proportions are given by weight.

Prior to mixing, the resin is preferably reduced to a dry, water dispersible powder, and the wood flour may preferably be of a size which will pass through an 80-mesh screen. Mixing should be most thorough and be done in a dry atmosphere. The dry mixture is stirred into a paste by slowly adding the mixture of powdered resin and wood flour to 4 parts of water. Thereupon the paste is diluted by an additional 4 parts of water and the wet mixture is thoroughly stirred. The .4 part of formaldehyde, diluted with 1 part of water, is then stirred into the mixture. The composition is then ready for use.

The following is a second example of an adhesive prepared in accordance with the invention:

| | Parts |
|---|---|
| Resin (powdered) | 12.0 |
| Wheat flour | 2.5 |
| Water | 14.0 |
| Formaldehyde | .4 |

In further illustrative formulas potato flour may be substituted for the wood flour in the first formula, and rye flour may be substituted for the wheat flour in the second formula. Preferably, the resins utilized in these formulas are of the urea formaldehyde class, although resins of the phenolic type have been used with satisfactory results. As in the first example, the resin should be reduced to a dry, water dispersible powder, and should be most intimately mixed with the flour. It will be noted that the several extenders require the use of different proportions of water. In general, however, the use of any one of the extenders herein mentioned increases the amout of water in the formula by substantially two parts. Without the extender in the composition, the water-like viscosity of the adhesive causes it to slip from an applicator wheel in a splicing machine so that insufficient adhesive is applied to the veneers to effect a glued joint. The use of the extenders hereinabove mentioned lends tackiness to the adhesive and insures the application of the proper amount to the veneers to effect a permanent bond. In these formulae the formaldehyde reacts to retard setting of the adhesive at ordinary room temperature and to accelerate setting of the adhesive when heat is applied thereto as in a veneer splicing machine.

An important advantage of the invention resides in the fact that it eliminates the steps heretofore practiced of applying wet glue to the edges of the veneers, thereafter drying the glue, and then moistening the glue immediately prior to the application of heat and pressure in the splicing machine. The steps eliminated by the method have been time consuming and having required the employment of labor and equipment which, under the present invention, may be allocated to more profitable work. According to the preferred technique, the method of the invention is practiced by applying the adhesive to the facing edges of the strips of wood veneer entering the splicing machine. This may be done by use of the applicator wheel heretofore used for moistening the dried glue previously applied to the edges of the veneer strips. In contradistinction to the brittle joint effected heretofore by the use of animal glues, the joint effected by the use of the adhesives herein disclosed is exceptionally flexible, and will withstand considerable flexing without breaking. This is of particular importance where the veneers so joined are to be used in the manufacture of curved surfaces, such as are embodied in the making of furniture and the like.

Having now described my invention and in what manner the same may be used, what I claim as new and desire to protect by Letters Patent is:

1. The method of joining wood veneers in edge to edge relation which comprises applying between adjacent edges of wood veneers an adhesive mixture of a heat reactive resin of the urea formaldehyde class and formaldehyde in the presence of an amount of water substantially equal to the amount of resin with the proportions determined by weight, and immediately applying heat and pressure to the joint between the veneers.

2. The method of joining wood veneers in edge to edge relation which comprises conveying strips of wood veneer in a horizontal plane in side by side positions, applying a mixture of a heat reactive resin of the urea formaldehyde class and formaldehyde in water to the juxtaposed edges of said veneers while being so conveyed, pressing said glued edges together while traveling along said plane, and applying heat to the joint between veneer strips simultaneously with the application of pressure thereto.

3. The method of joining wood veneers in edge to edge relation which comprises applying between the adjacent edges of wood veneers an adhesive mixture of a heat reactive resinous condensation product, wood flour and formaldehyde in water in which the proportion of formaldehyde to resin is not less than 1:30, pressing said edges together to form a glued joint, and immediately applying heat to said joint to set the glue.

4. As a new article of manufacture, the product of claim 3.

5. The method of edge gluing wood veneers comprising applying to the facing edges of adjacent veneers a mixture of a heat reactive resinous condensation product and water in the presence of an extender and formaldehyde, said mixture being capable of immediate reaction in the presence of heat to form a bond, and immediately thereafter pressing said veneers together to effect a glued joint and simultaneously applying heat to said joint to set the glue.

6. A product made in accordance with claim 5.

7. The method of edge gluing wood veneers comprising mixing a heat reactive resinous condensation product and an extender in water, adding thereto formaldehyde, the formaldehyde-resin ratio being not less than 1:30, applying said mixture to the facing edges of veneer strips, immediately thereafter pressing said edges together to form a glued joint, and simultaneously applying heat to said joint to set the glue.

8. The method of claim 7 wherein the extender is wheat flour.

9. The method of claim 7 wherein the extender is wood flour.

10. The method of claim 7 wherein the extender is potato flour.

11. The method of edge gluing wood veneers which consists in forming an adhesive bond in situ by applying therebetween an admixture of a water dispersible heat reactive resinous condensation product and formaldehyde in the presence of water, pressing said edges into contact with one another and immediately applying heat thereto to set the glue.

HENRY D. PFENNING.